United States Patent Office
3,536,673
Patented Oct. 27, 1970

3,536,673
DYE-RECEPTIVE POLYOLEFIN COMPOSITION CONTAINING POLYOXYMETHYLENE
Paolo Parrini, Novara, Italy, assignor to Montecatini Edison S.p.A., Milan, Italy
No Drawing. Filed Mar. 2, 1967, Ser. No. 622,017
Claims priority, application Italy, Mar. 7, 1966, 5,273/66
Int. Cl. D01f 1/06, 7/02
U.S. Cl. 264—78                               6 Claims

ABSTRACT OF THE DISCLOSURE

Dye-receptive polyolefin composition comprising a mixture of a polyolefin, preferably polypropylene, with about 5 to 25 by weight percent of polyolefin of a polyacetal. Preferably, dye-receptive fibers obtained by extruding the above mixes. Suitable polyacetals include homopolymers and copolymers of formaldehyde, trioxane and paraformaldehyde.

BACKGROUND OF THE INVENTION

Field of the invention

The present invention relates to the dyeing of synthetic textiles, more particularly polyolefin textile fibers, preferably polypropylene fibers, preferably with disperse or metallized dyestuffs. In particular, the invention relates to dyeable textile compositions comprising polyolefins and an additive for enhancing the dye-receptivity thereof, and to dye-receptive fibers produced therefrom.

Description of the prior art

Various dyeable compositions comprising a polyolefin and a modifier for enhancing the dye-receptivity of the polyolefin have been proposed. Such proposed dye-receptive modifiers include polyalkyleneimines, mixtures thereof with epoxy resins and epihalohydrin resins.

SUMMARY OF THE INVENTION

It has now surprisingly been found that textile fibers and other polyolefin compositions particularly suitable for dyeing in normal dyebaths, particularly of metallized and disperse dyestuffs, may be obtained by mixing polyolefins with 5 to 25% by weight of polyoxymethylenes. More particularly, excellent dye-receptive textile fibers are obtained by extruding polypropylene admixed with 5 to 25% by weight of polyoxymethylenes.

The present invention accordingly provides dye-receptive compositions comprising mixes of isotactic polypropylene with 5 to 25%, preferably 10 to 20%, by weight of polyoxymethylenic homopolymers or copolymers obtained from formaldehyde, trioxane, paraformaldehyde, etc.

DESCRIPTION OF THE PREFERRED EMBODIMENTS

The preferred additives are polyoxymethylenes obtained by gaseous phase, aqueous phase, bulk, solution or suspension polymerization of formaldehyde or trioxane and the copolymers thereof with various cyclic ethers and acetals, such as dioxolane, 1,3-dioxane, tetrahydrofuran, ethyleneglycolformal, propiolactone, butyrolactone, hexahydro-benzo-trioxepane, ethyleneoxide, trioxepane, trimethylene oxide, propylene oxide, butylene oxide, neopentyl formal, trioxa-bicyclodecane, naphtho-dioxane, etc.

The blending of the acetalic polymer additives with the polyolefin polymer, more particularly with isotactic polypropylene, generally is carried out by simply mixing the additive with the polymer, both in powdered form, while agitating. The addition can, however, also be carried out by other methods, such as mixing the polymer with a solution of the polyoxymethylene in a suitable solvent, followed by evaporation of the solvent.

The mixes are preferably granulated and then extruded with melt spinning devices, e.g., of the type described in Italian Pat. 614,043 and preferably with spinnerets of the type described in Italian Pat. 600,248, having a length/diameter ratio higher than 1. The granulation and spinning of the mixes are carried out by operating in the absence of oxygen, preferably under an inert gas atmosphere (nitrogen, argon, helium, etc.). The spinning can be carried out conveniently at a temperature of about 180–240° C. The spinning mixes may include small amounts (for instance from 0.1 to 2% by weight of the mix) of antioxidants (Plastomex of American Cyanamide) heat stabilizers (e.g. Santowhite Powder, Polygard) and light stabilizers (e.g. Ferro A.M. 101 of Ferro Chemicals Co., U.V. 535 of Geigy Co.), opacifiers ($TiO_2$), lubricants, etc.

After spinning, the fibers are subjected to a stretching process, with stretching ratios between about 1:2 and 1:10 at a temperature between about 80 and 150° C., in stretching devices heated with warm air or steam or with a similar fluid or provided with a heating plate. It is then possible to subject the fibers to a dimensional stabilization treatment, under conditions which permit or hinder shrinking, at temperatures of about 80–160° C. as described in Italian Pats. 566,914 and 588,318.

The fibers obtained by extruding of the mixes can be mono- or pluri-filaments and can be used for the preparation of continuous yarns or staple or for preparing bulk yarns or staple.

In addition to their excellent dye-receptivity, the fibers of the present invention show an increased stability, particularly to light.

In the following examples, the dyeings with disperse dyestuffs were carried out by immersing the fibers for 60 minutes in boiling dyebaths containing 4% of the dyestuff by weight of the fibers, 2% of an anionic surface-active agent (for instance Dispersol E of I.C.I. Organics Co., Providence, R.I.), with a fiber/dyebath ratio of 1:30, and then rinsing with running water.

The dyeings with metallized dyestuffs were carried out by immersing the fibers for 60 minutes in boiling dyebaths containing 4% of the dyestuff by weight of the fibers, 2% of a surface-active agent (Diapon T, sodium salt of oleylmethyltaurinic acid), 2% of acetic acid and 5% of sodium sulfate, with a fiber/dyebath ratio of 1:30, and then rinsing with running water.

The fastness of the dyeings to light, washing with water, rubbing proved to be more than satisfactory.

EXAMPLE 1

900 g. of isotactic polypropylene were mixed with 100 g. of a formaldehyde homopolymer, 5 g. of $TiO_2$ as the opacifier, and 2.5 g. of Santowhite Powder antioxidant (4,4′-butyliden-bis-(6-tert.butyl-m.cresol)) in a ball mill, at room temperature.

The polypropylene had the following characteristics:

specific viscosity $[\eta]=1.46$ (determined in tetrahydronaphthalene at 135° C.);
ash content=0.014%;
residue after heptane extraction=96.2%.

The formaldehyde homopolymer was stabilized with 0.25% of Santowhite Powder and 1.5% of polyamide B 40 of the Du Pont Co. (copolymer of nylon 6 (40%) and 60% of nylon 66).

It had the following characteristics:

$[\eta] = 0.62$ (determined in DMF (dimethylformamide) at 150° C.);

$\frac{\Delta P}{P} = 0.4\%$ (weight loss at 222° C.)

$K_{222° C.} = 0.02\%$ (weight loss rate).

The mix thus obtained was granulated in an extruder under a nitrogen atmosphere at 225° C. The granulate was then spun in a melt spinning device under the following conditions:

screw temperature=220° C.;
head temperature=220° C.;
spinneret temperature=215° C.;
spinneret type=10X (0.8 mm./5 mm.);
winding speed=450 m./min.

The yarn thus obtained was subjected to stretching on a hot plate at a temperature of 135° C. and with a stretching ratio of 1:4.8. After stretching, the yarn had the following serimetric characteristics:

tenacity (g./den.)=5.4;
elongation (percent)=25%.

The fibers obtained had good receptivity and good fastness with the following dyestuffs:

Plastosoluble or disperse dyestuffs

Brilliant yellow Foron 6 GLF ___ C.I. Disperse yellow 50.
Blue Eastman _____ C.I. Disperse blue 3.
Foron Scarlet 3 GLF _____ C.I. Disperse red 54.

Pre-metallized dyestuffs

Red Lanasyn 2 GL _____ C.I. Acid red 216.
Brown Lanasyn GRL.
Pure green Lanasyn EGL.
Red Stenolana BL _____ C.I. Acid red 271.
Brown Stenolana 3BL.

EXAMPLE 2

850 g. of isotactic polypropylene were mixed with 5 g. of TiO$_2$, 5 g. of Polygard antioxidant (tris-phenyl-nonylphosphite), 2.5 g. of calcium stearate and 150 g. of a trioxane-dioxolane copolymer in a Henschel type mixer at room temperature.

The polypropylene used had the following characteristics:

$[\eta] = 1.51$ (determined in tetrahydronaphthalene at 135° C.);
ash content=0.01%;
residue after heptane extraction=97.5%.

The trioxane-dioxolane copolymer had the following characteristics:

dioxolane percentage=2.5% by weight;
$[\eta] = 0.65$ (determined in DMF at 150° C.);
melting point=169° C. (determined dilatometrically);
$K_{222° C.} = 0.01\%$ (determined on a thermobalance);

$\frac{\Delta P}{P} = 0.1\%$ (determined on a thermobalance)

The mixture thus obtained was granulated in an extruder under a nitrogen atmosphere at 220° C. The granulate was then spun in a melt spinning device under the following conditions:

screw temperature=230° C.;
head temperature=230° C.;
spinneret temperature=225° C.;
spinneret type=6X (0.8 mm./5 mm.);
winding speed=450 m./min.

The yarn thus obtained was subjected to stretching on a hot plate at a temperature of 130° C. and with a stretching ratio of 1:4.5. After stretching, the yarn had the following characteristics:

tenacity=5.00 g./den.;
elongation=30%.

The fibers obtained had good receptivity and good fastness with the dyestuffs used in Example 1.

Variations can, of course, be made without departing from the spirit and scope of the invention.

Having thus described my invention, what I desire to secure by Letters Patent and hereby claim is:

1. The process of dyeing fibers of isotactic polypropylene with a dyestuff selected from the group consisting of metallized and disperse dyestuffs which comprises mixing the isotactic polypropylene with from about 5 to 25% by weight thereof of a polyoxymethylene selected from the group consisting of homopolymers of formaldehyde, trioxane and paraformaldehyde and copolymers of at least one of the foregoing monomers with a member selected from the group consisting of a cyclic ether and a cyclic acetal, extruding the mixture to form filaments by melt spinning at 180–240° C., drawing the filaments at 80–150° C. and then dyeing with the selected dyestuff by immersing the filaments in a boiling dyebath containing said selected dyestuff.

2. The process of claim 1 wherein the amount of said polyoxymethylene is from about 10 to 20% by weight.

3. The process of claim 1 wherein said polyoxymethylene is a homopolymer of formaldehyde.

4. The process of claim 3 wherein said mixture consists essentially of polypropylene and from about 10 to 20% by weight of said polyoxymethylene.

5. The process of claim 1 wherein said polyoxymethylene is a trioxane-dioxolane copolymer.

6. The process of claim 5 wherein said mixture consists essentially of polypropylene and from about 10 to 20% of said trioxane-dioxolane copolymer.

References Cited

UNITED STATES PATENTS 3,226,455 12/1965 Matsubayashi et al. ___ 260—897
3,090,769 5/1963 Coover et al. _____ 260—45.5

FOREIGN PATENTS 933,627 6/1965 Great Britain.

MURRAY TILLMAN, Primary Examiner

C. J. SECCURO, Assistant Examiner

U.S. Cl. X.R.

8—31, 42, 180; 260—897; 264—210